United States Patent [19]
Baeder et al.

[11] Patent Number: 5,706,342
[45] Date of Patent: Jan. 6, 1998

[54] METHOD AND APPARATUS FOR OFF-HOOK DETECTION

[75] Inventors: David J. Baeder, Cranston, R.I.; Richard F. Ciosek, Swansea, Mass.

[73] Assignee: Business Link International, Smithfield, R.I.

[21] Appl. No.: 549,563

[22] Filed: Oct. 27, 1995

[51] Int. Cl.[6] ............................. H04M 3/22; H04M 1/68
[52] U.S. Cl. ......................... 379/382; 379/194; 379/373; 379/377; 379/387
[58] Field of Search ................... 379/382, 377, 379/381, 387, 399, 418, 373, 194, 195, 354, 355, 356, 380

[56] References Cited

U.S. PATENT DOCUMENTS

| | | | |
|---|---|---|---|
| 4,802,207 | 1/1989 | Uchida | 379/377 X |
| 4,803,718 | 2/1989 | Neil et al. | 379/377 X |
| 5,033,078 | 7/1991 | Andoh | 379/355 X |
| 5,105,461 | 4/1992 | Tsurusaki et al. | 379/382 |
| 5,140,631 | 8/1992 | Stahl | 379/377 |
| 5,291,545 | 3/1994 | Stahl | 379/377 X |
| 5,402,482 | 3/1995 | Minohara et al. | 379/377 |
| 5,422,939 | 6/1995 | Kramer et al. | 379/377 X |
| 5,499,287 | 3/1996 | Campbell et al. | 379/373 X |
| 5,506,891 | 4/1996 | Brown | 379/377 X |
| 5,521,974 | 5/1996 | Hayashi et al. | 379/377 X |

OTHER PUBLICATIONS

Graf, Rudolf F., *Encyclopedia of Electronic Circuits*, TAB Books, 1st Ed., vol. 1, p. 633 (1985).

*Primary Examiner*—Krista Zele
*Assistant Examiner*—Devendra T. Kumar
*Attorney, Agent, or Firm*—Needle & Rosenberg, P.C.

[57] ABSTRACT

An apparatus for detecting an off-hook condition on a telephone, the apparatus being connected to the tip line and the ring line of a telephone line, a first potential difference existing between the tip line and the ring line, the telephone line connected to the telephone having a handset. A circuit generates a difference signal representative of the absolute value of the first potential difference. A first comparator, responsive to the difference signal, generates a first indicator signal when the difference signal is above a first value corresponding to a maximum value of potential difference between the tip line and the ring line when the handset is off-hook. A second comparator, responsive to the difference signal, generates a second indicator signal when the difference signal is below a second value corresponding to a minimum value of potential difference between the tip line and the ring line when the handset is off-hook. A circuit, responsive to the first indicator signal and the second indicator signal, indicates when the handset is off-hook.

20 Claims, 5 Drawing Sheets

METHOD AND APPARATUS FOR OFF-HOOK DETECTION

REFERENCE TO MATERIAL SUBJECT TO COPYRIGHT PROTECTION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

1. Field of the Invention

The invention relates to telecommunications devices, and more particularly, to a device that determines when a telephone handset is off of its hook switch.

2. Description of the Prior Art

Integration of telephones and auxiliary telecommunications devices (e.g., facsimile machines) on a single telephone line has become common with the new demands for these auxiliary devices. Because many auxiliary devices cannot operate concurrently with a telephone, these devices must be provided with a means to determine when the telephone is not in use. The most common means for such a determination is a circuit that detects when the telephone handset is off of the hook switch, the switch that disconnects the telephone from the line. When the off-hook detection circuit detects an off-hook condition (i.e., when the telephone is in use), any auxiliary devices connected to the telephone line are turned off. When the off hook detection circuit detects an on-hook condition, auxiliary devices may operate normally.

Typically, an off-hook detection circuit will use a line current sensing relay or an opto-isolator to sense current flow through the phone line with the flow of current indicating an off hook condition. In order to use this type of circuit, however, the current sensing relay must be connected in line between the telephone line and the telephone set. Currently, Bellcore regulations do not allow inserting a device between the telephone line and a pay telephone set. Therefore, a current sensing off-hook detection circuit cannot be used to connect auxiliary devices to a pay telephone.

Another problem associated with the connection of auxiliary devices to pay telephones is the phenomenon of polarity reversals between the tip line and the ring line. Typically, current flows in one direction between the tip line and the ring line of a telephone line. However, when a telephone makes a long distance connection, the polarity of tip-ring current may reverse and the current will flow in the opposite direction. In such cases, the tip-ring voltage may go down to near ground for up to about two seconds. Existing circuits are unable to distinguish between such a polarity reversal and a situation in which the telephone is disconnected from the telephone line, thereby making it difficult to control auxiliary devices connected to a pay telephone.

The prior art does not teach a circuit that detects off-hook conditions without being connected between the telephone line and the telephone set.

SUMMARY OF THE INVENTION

The disadvantages of the prior art are overcome by the present invention which comprises an apparatus, connected to the tip line and the ring line of a telephone line, for detecting an off-hook condition on the telephone, wherein a first potential difference exists between the tip line and the ring line and the telephone line is connected to a telephone having a handset. A circuit generates a difference signal representative of the absolute value of the first potential difference. A first comparator, responsive to the difference signal, generates a first indicator signal when the difference signal is above a first value corresponding to a maximum value of potential difference between the tip line and the ring line when the handset is off-hook. A second comparator, responsive to the difference signal, generates a second indicator signal when the difference signal is below a second value corresponding to a minimum value of potential difference between the tip line and the ring line when the handset is off-hook. A circuit, responsive to the first indicator signal and the second indicator signal indicates when the handset is off-hook.

Another aspect of the invention is an apparatus, connected to the tip line and the ring line of a telephone line, for detecting an off-hook condition on the telephone, wherein a first potential difference exists between the tip line and the ring line and the telephone line is connected to a telephone having a handset. The apparatus includes a bridge circuit that has a first input connected to the tip line and a second input connected to the ring line. The bridge circuit also has a first output and a second output, a second potential difference existing between the first output and the second output, the second potential difference equal to the absolute value of the first potential difference. A differential amplifier, operationally coupled to the first output and the second output, generates a difference signal representative of the second potential difference. A first comparator, responsive to the difference signal, generates a first indicator signal when the difference signal is above a first value corresponding to a maximum value of potential difference between the tip line and the ring line when the handset is off-hook. A second comparator, responsive to the difference signal, generates a second indicator signal when the difference signal is below a second value corresponding to a minimum value of potential difference between the tip line and the ring line when the handset is off-hook. A microprocessor, responsive to the first indicator signal and the second indicator signal, is directed by a computer program to: generate an off-hook signal indicating that the handset is off-hook when the difference signal is between the first value and the second value; continue to generate the off-hook signal if the difference signal drops below the second value and remains below the second value for less than a predetermined period; and cease to indicate that the handset is off-hook if the difference signal drops below the second value and remains below the second value for at least the predetermined period.

Another aspect of the invention is a series of operational steps to be performed on a computer used to detect an off-hook condition of a telephone and to perform control functions of an auxiliary telecommunications device, the telephone and the auxiliary device being operationally coupled to a telephone line on which DTMF digits are dialed, the telephone having a handset and the computer being responsive to a voltage difference signal indicative of a voltage value between the tip line and the ring line of the telephone. DTMF digits being dialed are recorded into a memory when the difference signal indicates that the voltage value is below the maximum value corresponding to the off-hook condition. A timer is started when the voltage signal indicates that the voltage value has fallen below a predetermined value. The recording of DTMF digits is interrupted and the memory is reset when the timer indicates that a preselected period has passed while the voltage value is below the predetermined value.

Another aspect of the invention is an apparatus connected to the tip line and the ring line of a telephone line, the telephone line being connected to a telephone and an auxiliary device is connected to the tip line and the ring line. A circuit detects an off-hook condition in the telephone. A circuit, responsive to the detecting circuit, inhibits the operation of the auxiliary device when the detecting circuit detects an off-hook condition.

An advantage of the invention is that it detects an off-hook condition in a telephone while being connected to the tip line and the ring line of a telephone line, external to the current path between the telephone and the telephone line.

A further advantage of the invention is that it discriminates between low voltage occurring as a result of polarity reversals and low voltage occurring as a result of a telephone being disconnected.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
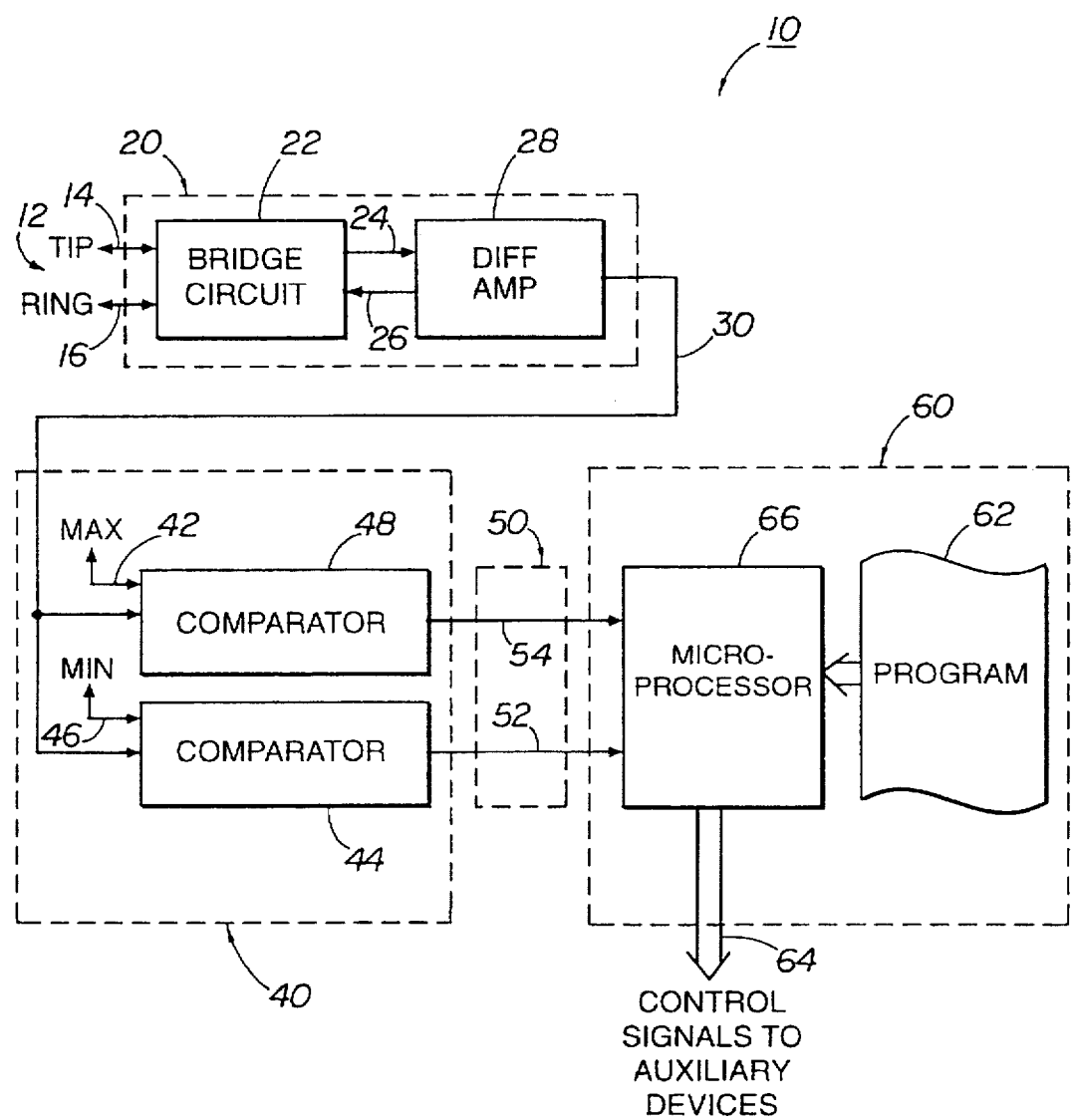
FIG. 1 is a block diagram of a first embodiment of the invention.

A preferred embodiment of the invention is now described in detail. Referring to the drawings, like numbers indicate like parts throughout the views. As used in the description herein and throughout the claims that follow, "a," "an," and "the" includes plural reference unless the context clearly dictates otherwise. Also as used in the description herein and throughout the claims that follow, the meaning of "in" includes "in" and "on" unless the context clearly dictates otherwise.

As shown in FIG. 1, the present invention is a device 10 for determining the off-hook status of a telephone line 12 comprising a circuit 20 for sensing the absolute value of the potential difference between the tip line 14 and the ring line 16 of the telephone line 12. The sensing circuit 20 generates a difference signal 30 representative of the absolute value of the potential difference between the tip line 14 and the ring line 16. A voltage range detecting circuit 40, responsive to the difference signal 30, determines whether the potential difference between the tip line 14 and the ring line 16 is within a preselected range and generates at least one range indicator signal 50. A control unit 60, responsive to the range indicator signal 50, determines whether an off-hook condition exists and generates at least one control signal 64 used in controlling an auxiliary device, such as a facsimile machine (not shown).

The sensing circuit 20 comprises a bridge circuit 22, having two output lines 24 and 26, that maintains a single direction of current flow. Even though current on the telephone line 12 may flow from the tip line 14 to the ring line 16, or from the ring line 16 to the tip line 14, the output current from the bridge circuit 22 will always flow from output line 24 to output line 26. Therefore, the potential difference across output lines 24 and 26 will always maintain a single polarity. The sensing circuit 20 also comprises a differential amplifier 28, responsive to output lines 24 and 26, that generates the difference signal 30.

The range detecting circuit 40 may comprise a first comparitor 48 and a second comparitor 44. The first comparitor 48 is responsive to the difference signal 30 and generates a first indicator signal 54 when the difference signal 30 is above a first value 42, the first value 42 corresponding to a maximum value of potential difference between the tip line 14 and the ring line 16 when the handset is off-hook. The second comparator 44 is responsive to the difference signal 30 and generates a second indicator signal 52 when the difference signal 30 is below a second value 46, the second value 46 corresponding to a minimum value of potential difference between the tip line 14 and the ring line 16 when the handset is off-hook.

In a typical telephone line, the normal on-hook tip-ring voltage is about 48V, the off-hook tip-ring voltage falls between 36V and 2V, and a tip-ring voltage of less than 2V is found when either the telephone is disconnected or the polarity of the telephone line 12 is reversing as a result of a long distance call being placed. Therefore, in this embodiment, the first value 42 is 36V and the second value 46 is 2V. Given that the value of the difference signal 30 could be proportional to the voltage between the output lines 24 and 26, and not equal to it, the first value 42 and the second value 46 could have values other than 36V and 2V, respectively.

The control unit 60 comprises a microprocessor 66 that receives input from the first indicator signal 54 and the second indicator signal 52 and generates at least one signal 64, which indicates when the handset is off-hook. Signal 64 can be used to control auxiliary devices (e.g., facsimile machines). A computer program 62 directs the microprocessor 66 in the analysis of the first indicator signal 54, the second indicator signal 52 and the generation of the control signals 64. In one embodiment, the microprocessor 66 is a Z84C1510, available from Zilog Corporation, illustrative code for which is given in the Appendix.

Figure 2:
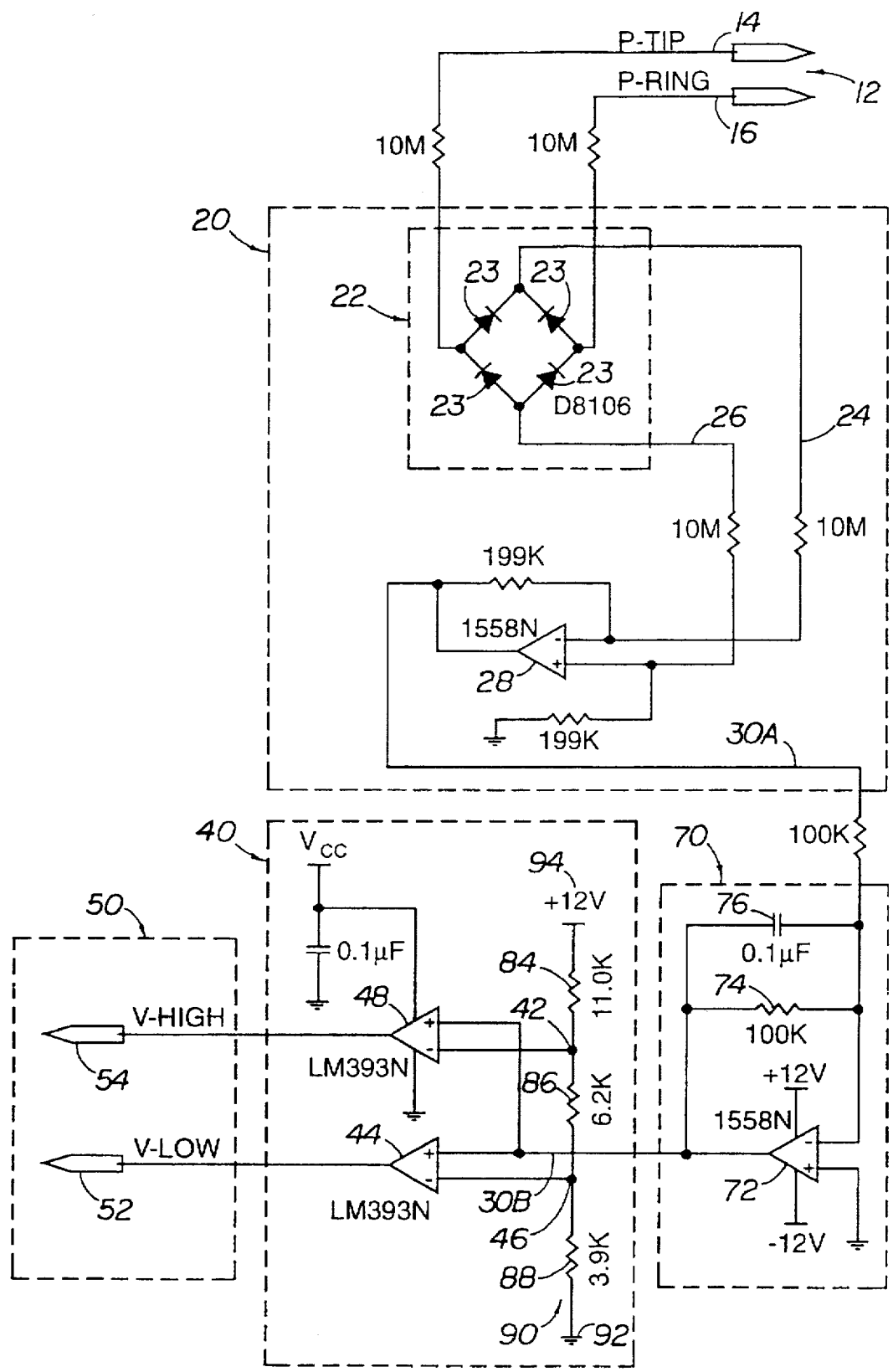
FIG. 2 is a schematic diagram of the first embodiment of the invention.

As shown in FIG. 2, the bridge circuit 22 comprises four diodes 23 interconnected with the tip line 14, the ring line 16, output line 24 and output line 26 so that current will only flow in one direction in output line 24 and in output line 26. The differential amplifier 28 comprises an integrated circuit op amp (such as a 4558N op amp) which is configured to generate a difference signal 30A. A bandpass fiker 70 receives the difference signal 30A and removes selected AC components (e.g., voice and noise signals) from the difference signal 30A thereby generating a clean DC difference signal 30B. The bandpass filter 70 comprises an op amp 72 (such as a 4558N op amp) feeding back the DC difference signal 30B through a capacitor 76 and a resistor 74 connected in parallel. As would be obvious to one skilled in the art of circuit design, many other types of bandpass filters could be used, including filters made of entirely passive RLC components or digital filters.

The first comparitor 48 and the second comparitor 44 could comprise two TTL comparators (e.g., LM393N comparators), each receiving the DC difference signal 30B. The first comparator also receives a first signal 42 representative of the first value and the second comparitor receives a second signal 46 representative of the second value from a reference signal generating circuit 90. The first signal 42 is tapped from the connection of a first resistor 84 and a second resistor 86. The second signal 46 is tapped from the connection of the second resistor and a third resistor 88. The first resistor 84, the second resistor 86 and the third resistor 88 are connected in series between a reference voltage 94 and ground 92. The first comparitor 48 generates the first indicator signal 54 and the second comparitor 44 generates the second indicator signal 52, both indicator signals 54 and 52 being binary signals.

Figure 3:
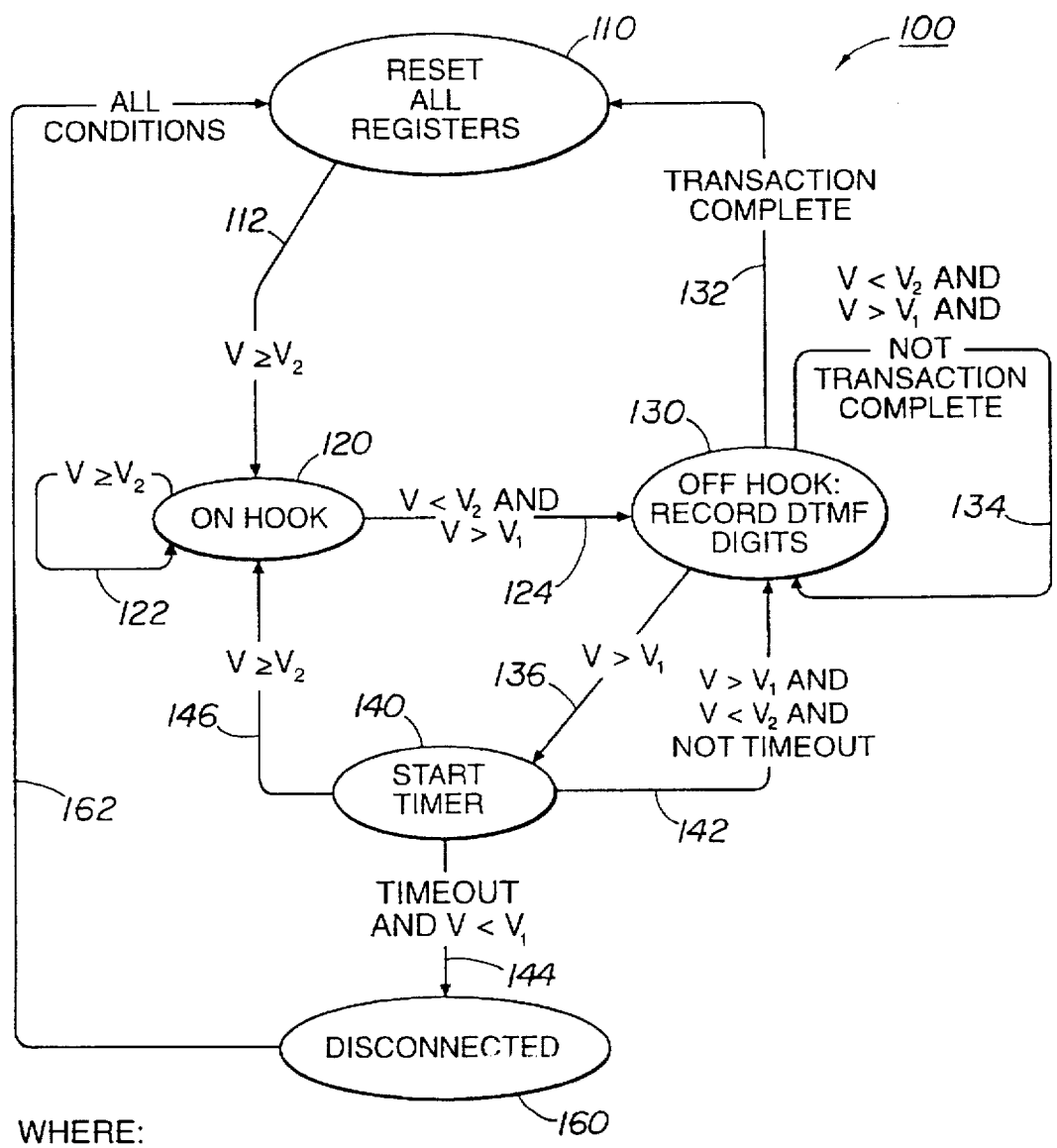
FIG. 3 is a state diagram of the logic employed in the invention.

As shown in FIG. 3, one illustrative embodiment of the logic used to determine off-hook status may be represented in a state diagram 100 having five states: a RESET ALL REGISTERS state 110, in which the circuit is brought to an initial state; an ON-HOOK state 120; an OFF-HOOK state 130, during which DTMF digits may be recorded; a start timer state 140; and a DISCONNECTED state 160, corresponding to a telephone line disconnection. Input variables include V, which is the voltage between the tip line and the ring line. Constants include V1, the minimum tip-ring voltage value associated with a connected telephone line, and V2, the minimum tip-ring voltage associated with an on-hook condition. The state transition variables are all true-false conditions and include: $V>V1$; $V<V1$; $V<V2$; $V \geq V2$; TIMEOUT (which is true when a timer determines that a predetermined period has passed); and TRANSACTION COMPLETE (which indicates that a complete set of DTMF digits have been dialed).

From the initial RESET state 110, a $V \geq V2$ true condition will cause a transition 112 to the ON-HOOK state 120. From the ON-HOOK state 120, a $V \geq V2$ true condition will cause a return 122 to the ON-HOOK state 120 and a ($V<V2$ AND $V>V1$) true condition (which indicates that the tip-ring voltage is in the off-hook range) will cause a transition 124 to the OFF-HOOK state 130. While in the OFF-HOOK state 130, a ($V<V2$ AND $V>V1$ AND NOT TRANSACTION COMPLETE) true condition will cause a return 134 to the OFF-HOOK state 130. A TRANSACTION COMPLETE true condition will cause a transition 132 to the RESET state 110 and a $V<V1$ true condition (which indicates that either a polarity reversal is taking place or the telephone is disconnected) will cause a transition 136 from the OFF-HOOK state 130 to the START TIMER state 140. From the START TIMER state 140, a $V \geq V2$ true condition will cause a transition 146 to the ON-HOOK state 146, a ($V>V1$ AND $V<V2$ AND NOT TIMEOUT) true condition will cause a transition 142 to the OFF-HOOK state 130, and (TIMEOUT AND $V<V1$) condition (which indicates that a low-voltage condition has existed between the tip line and the ring line for too long of a time to be a pole reversal) will cause a transition 144 to the DISCONNECTED state 160. From the DISCONNECTED state 160, any condition will cause a transition 162 to the RESET state 110. As would be obvious to one skilled in the art of logic circuit design, this state machine could be implemented in many ways, including: with software on a microprocessor employed in the above-described embodiment, with discrete logic elements (such as flip-flops in combination with logic gates), with PLA's or PAL's in combination with flip-flops (or other bistable devices), or entirely with software when a digital representation of the tip-ring potential difference is provided to a computer running the software.

Figure 4:
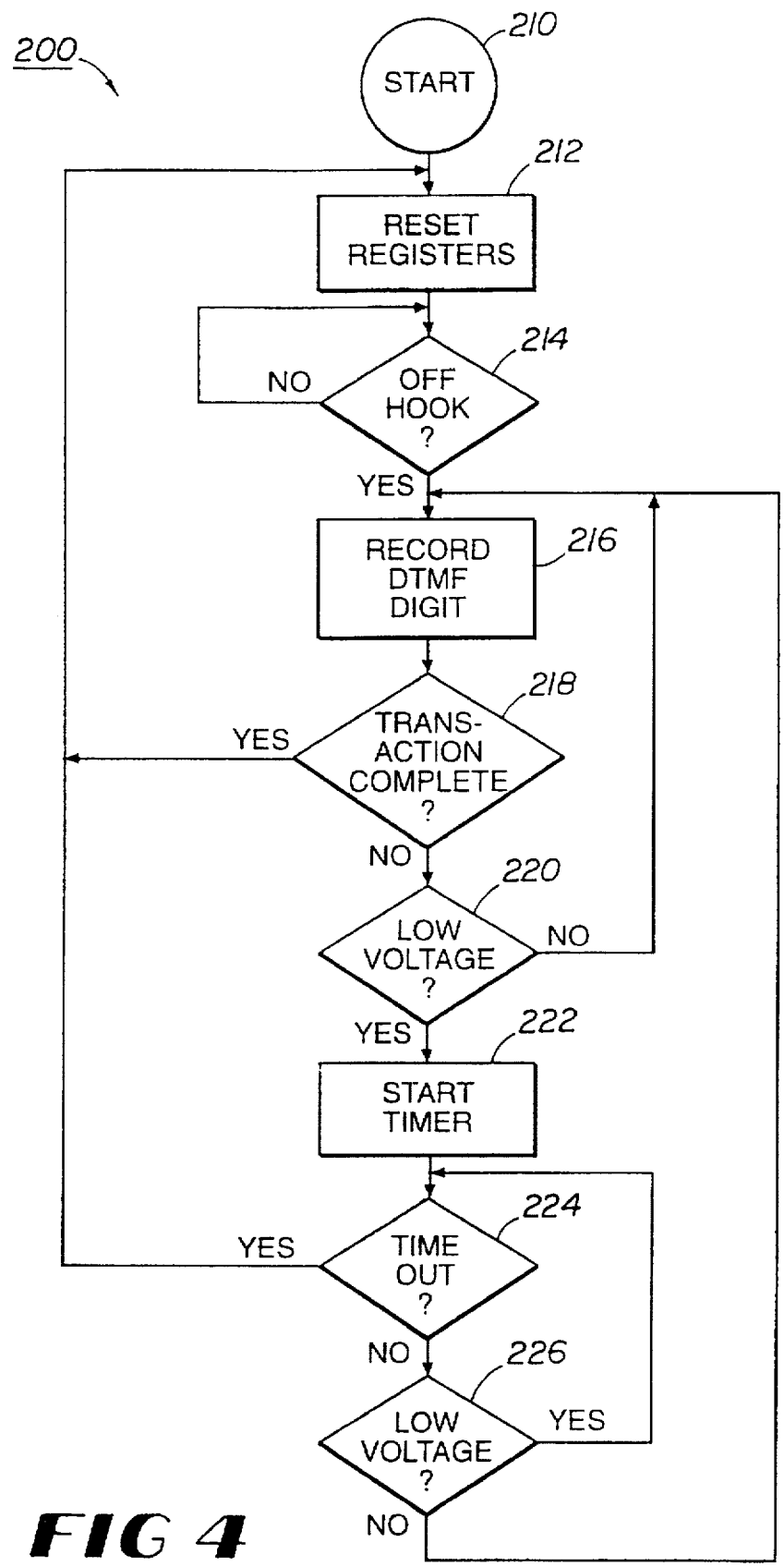
FIG. 4 is a flow chart of a computer program used in the present invention.

As shown in FIG. 4, in a software implementation of one illustrative embodiment of the present invention 200, the program is entered 210 and performs an operation 212 that resets any registers used in storing DTMF digits. A test 214 is performed to determine whether the handset is off-hook (i.e., whether the tip-ring voltage is in the off-hook range). If the handset is not off-hook, then test 214 is repeated. If an off-hook condition is detected, then an operation 216 is performed that records the current DTMF digit. Next, a test 218 determines if all of the DTMF digits have been recorded, thereby making the dialing transaction complete. If the transaction is complete, then normal operation of the telephone-auxiliary device continues and control passes back to the reset registers operation 212. If the transaction is not complete, then a test 220 is performed to determine if the tip-ring voltage is low (i.e., corresponding to a voltage that indicates either a polarity reversal or a disconnected telephone). If the voltage is not low, then control passes to operation 216 and the next DTMF digit is recorded. If the voltage is low, then an operation 222 starts a timer (which could be implemented in either hardware or software, or a combination thereof, as would be obvious to those skilled in the art) and a test 224 determines whether the timer has reached a time-out condition. If the timer has reached the time-out condition, then the telephone line must be disconnected and control returns to the reset registers operation 212. If the time-out condition has not been reached, then a test 226 is performed to determine if the tip-ring voltage is still low. If the tip-ring voltage is still low, then control returns to the time out test 224. If the tip-ring voltage is no longer low, then control passes to the record operation 216 and the next DTMF digit is recorded.

Figure 5:
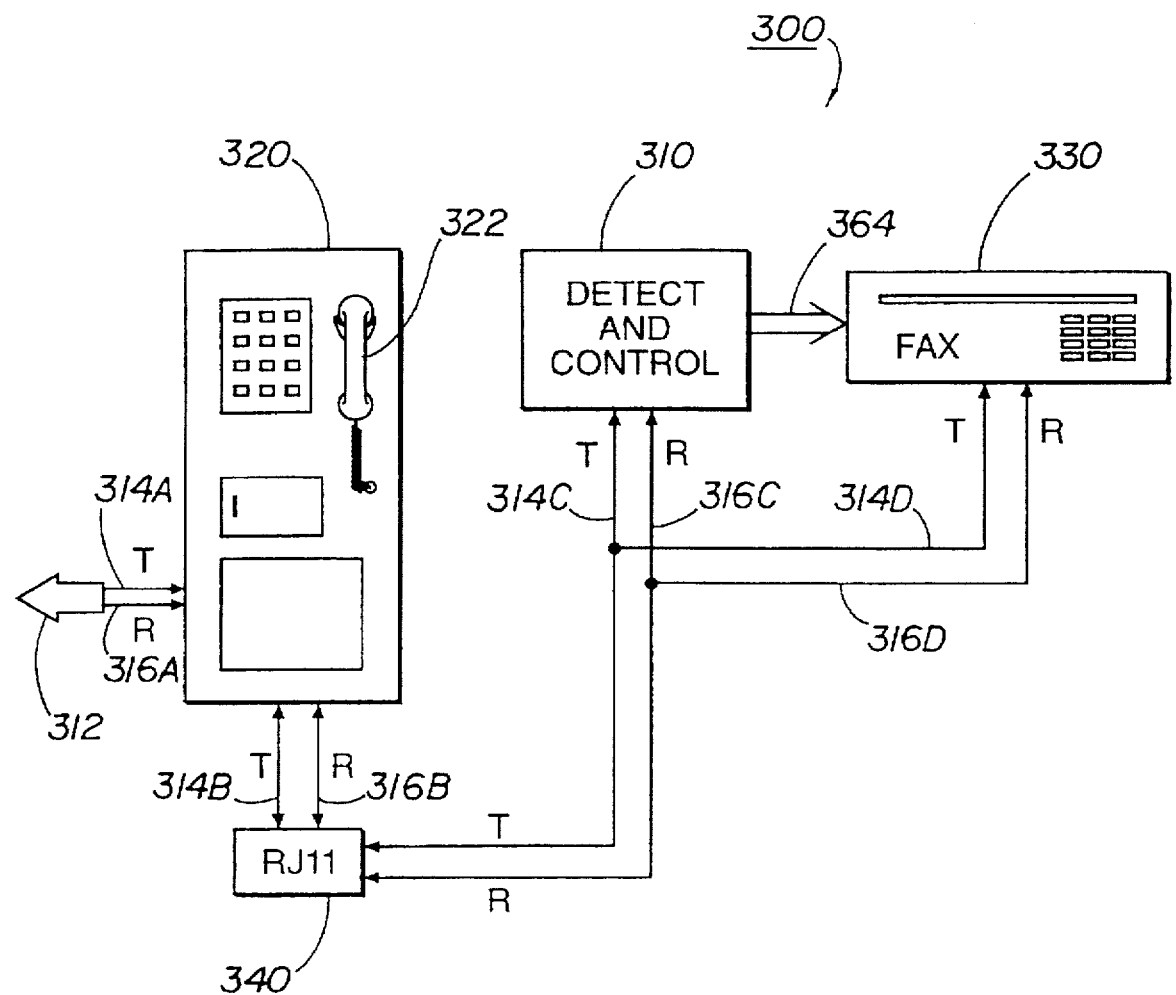
FIG. 5 is a block diagram of a second embodiment of the invention.

As shown in FIG. 5, one embodiment of the invention comprises a pay telephone/facsimile machine apparatus 300 connected to the tip line 314A and the ring line 316A of a telephone line 312. The apparatus 300 comprises a pay telephone 320 having a handset 322, a control circuit 310 and a facsimile machine 330. The pay telephone 320 outputs the tip line 314B and the ring line 316B, both of which are connected to an RJ11 connector 340. Both the control circuit 310 and the facsimile machine 330 receive the tip line 314C–D and the ring line 316C–D from the RJ11 connector 340. The control circuit 310 provides control signals 364 to the facsimile machine 330, based on the on-hook/off-hook status of the pay telephone 320.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

---

APPENDIX

```
;******************************************************************** *
;*               HOOK STATUS MONITORING ROUTINE                       *
;* CTC3 is set to interrupt every 1 ms. which causes the hook status to be polled.  *
;* The flag (ON_HOOK) is st to the appropriate state (True or False) as determined by this  *
;* routine. All other routines use the ON_HOOK flag to check if the unit is on or off hook.  *
```

-continued

APPENDIX

```
;*************************************************************** *
;
CTC_CHANNEL3:
PUSH           AF
PUSH           BC
PUSH           HL                      ;Save Registers
LD             A, (RING, DTMF)
OR             A                       ;Are we checking for DTMF
JR             Z, HOOK TEST            ;If no, go to hook status routine
LD             A, RESI                 ;If yes, update DTMF available bit
OUT            (SIOA_CONTROL),A
IN             A, (SIOA_CONTROL)       ;Get DTMF available status
PUSH           AF                      ;Save status
LD             A, (DTMF STAT)          ;Get last status
OR             A
JR             Z, DTMF_LOW             ;jump if last status was LOW
POP            AF                      ;Retrieve DTMF status
BIT            5,A                     ;Test
JR             NZ,HOOK_TEST            ;If status has not changed since last
CALL           GET_DTMF                ;Go to hook test, else get DTMF digit
DTMF_STAT_CPL:
LD             A,(DTMF_STAT)           ;Update last status flag
CPL
LD             (DTMF_STAT) ,A
JR             HOOK_TEST
DTMF_LOW:
POP            AF                      ;Retrieve DTMF status
BIT            5 , A                   ;If status has not changed since last
JR             Z,HOOK_TEST             ;Go to hook test, else
XOR            A
LD             (DTMF_TIMER)            ;Clear DTMF timer
JR             DTMF_STAT_CPL           ;and update last status flag
HOOK_TEST:
LD             A, (ON_HOOK)            ;Check hook state flag
OR             A
JR             Z,HOOK_TEST_ON          ;If on hook, jump
IN             A, (PIOA DATA)          ;If off hook, get hook status
AND            11000000b               ;Mask unused bits
JR             Z,HOOK_TEST_OFF6        ;If line loss (00) jump
LD             HL, 0000h               ;Clear line loss counter
LD             (LINE_DELAY) ,HL
CP             11000000b
JR             Z,HOOK_TEST_OFF1        ;If on hook(11)jump
LD             A, (HOOK_TEST_ANS)      ;If off hook then check if we need
OR             A                       ;to monitor 2100 Hz Answer Tone
JR             NZ,HOOK_TEST_OFF2       ;If no, jump
CALL           TEST_2100HZ             ;If yes, call 210 Hz Test.
HOOK_TEST_OFF2:
XOR            A                       ;Clear hook timer if
LD             (HOOK_TIMER) ,A         ;still off hook
JR             HOOK_TEST_EXIT          ;And exit.
HOOK_TEST_OFF1:
LD             A, (HOOK_TIMER)
INC            A
LD             (HOOK_TIMER) ,A
LD             B,A
LD             A, (HOOKSW_DELAY)
CP             B                       ;Compare with delay value
JR             NZ,HOOK_TEST_EXIT       ;Exit if not equal to delay
JR             HOOK_TEST_OFF8
HOOK_TEST_OFF6:
LD             HL, (LINE_DELAY)        ;Increment line loss timer
INC            HL
LD             (LINE DELAY) ,HL        ;Compare to coin line value
LD             A, (COIN_DELAY)
CP             H
JR             NZ,HOOK_TEST_EXIT       ;Exit if not equal to delay
HOOK_TEST_OFF8:
XOR            A                       ;If equal to delay, set
LD             (ON_HOOK) ,A            ;Flag to on hook
LD             (LINE_DELAY) ,A
LD             (LINE_DELAY+1) ,A       ;Reset line loss timer
LD             (HOOK_TIMER) ,A         ;Reset hook timer
JR             HOOK_TEST_EXIT          ;And exit
HOOK_TEST_ON:
IN             A, (PIOA_DATA)          ;Get hook status
AND            11000000b               ;Mask unused bits
CP             01000000b               ;Check for off hook
JR             Z,HOOK_TEST_ON1         ;Jump if off hook
```

-continued

APPENDIX

```
XOR             A
LD              (HOOK_TIMER) ,A
JR              HOOK_TEST_EXIT          ;Check hook timer
                                        ;Still on hook
HOOK_TEST_ON1:
LD              A, (HOOK_TIMER)
INC             A                       ;Increment hook timer
LD              (HOOK_TIMER) ,A
CP              20d                     ;Compare to 20 ms.
JR              NZ,HOOK_TEST_EXIT       ;Jump if not 20 ms.
XOR             A
LD              (HOOK_TIMER) ,A         ;Reset hook timer.
DEC             A                       ;A = FALSE
LD              (ON_HOOK) ,A            ;Set ON_HOOK = FALSE
LD              A, (HOOK_INT)
OR              A                       ;Check for interrupt on
JR              Z,HOOK_TEST_INT_EXIT    ;Off Hook, and jump if yes
HOOK_TEST_EXIT:
POP             HL
POP             BC
POP             AF
EI
RETI
HOOK_TEST_INT_EXIT:
LD              SP,STACKTOP             ;If interrupt on off hook
LD              HL,OFF_HOOK             ;Reset stack and force a return
PUSH            HL                      ;To the off hook routine
EI
RETI
;*********************************************************************
;* CTC initialization INIT_CTC3                                       *
;*     INIT_CTC3                                                      *
;*********************************************************************
        ;CTC3 is used for hookswitch testing and DTMF detection.
INIT_CTC3:
LD              A, CTC_CTRL + CTC_T_CONST + CTC_256 + CTC_INT_EN
OUT             (CTC3),A
LD              A, 38d                  ;1000 Hz
OUT             (CTC3),A
LD              A, FALSE
LD              (HOOK_INT) ,A           ;Disable hook switch interrupts
LD              (HOOK_TEST_ANS) ,A      ;Disable 2100 Hz testing
RET
```

What is claimed is:

1. An apparatus, connected to the tip line and the ring line of a telephone line, a first potential difference existing between the tip line and the ring line, the telephone line connected to a telephone having a handset, for detecting an off-hook condition on the telephone, comprising:

a. means for generating a difference signal representative of the absolute value of the first potential difference;

b. a first comparator means, responsive to the difference signal, for generating a first indicator signal when the difference signal is above a first value corresponding to a maximum value of potential difference between the tip line and the ring line when the handset is off-hook;

c. a second comparator means, responsive to the difference signal, for generating a second indicator signal when the difference signal is below a second value corresponding to a minimum value of potential difference between the tip line and the ring line when the handset is off-hook; and d. means, responsive to the first indicator signal and the second indicator signal, for indicating when the handset is off-hook.

2. The apparatus of claim 1, further comprising means, responsive to the second indicator signal, for detecting when the second indicator signal is below the second value for longer than a preselected period, the preselected period being the maximum amount of time that the second indicator signal would remain below the second value while the telephone is connected to the telephone line.

3. The apparatus of claim 2 wherein the detecting means comprises a microprocessor programmed to:

a. measure the amount of time that the second indicator signal is below the second value;

b. compare the amount of time to the preselected period; and c. generate a disconnected signal when the amount of time exceeds the preselected period, thereby indicating that the telephone is disconnected from the telephone line.

4. The apparatus of claim 1 wherein the difference signal generating means comprises:

a. a bridge circuit having a first input connected to the tip line and a second input connected to the ring line and having a first output and a second output, a second potential difference existing between the first output and the second output, the second potential difference representative of the absolute value of the first potential difference; and b. a differential amplifier, responsive to the first output and the second output of the bridge circuit, that generates the difference signal representative of the second potential difference.

5. The apparatus of claim 4 wherein the differential amplifier comprises an integrated circuit op amp.

6. The apparatus of claim 1 wherein the first comparator means and the second comparator means each comprise TTL comparators.

7. The apparatus of claim 1 wherein the off-hook indicating means comprises a microprocessor programmed to:
   a. compare the states of the first indicator signal and the second indicator signal to a plurality of preselected states; and
   b. generate an off hook signal when the first indicator signal and the second indicator signal have values equal to a preselected state corresponding to an off-hook condition, thereby indicating that the handset is off-hook.

8. An apparatus, connected to the tip line and the ring line of a telephone, a first potential difference existing between the tip line and the ring line, the telephone having a handset, for detecting an off-hook condition on a telephone, comprising:
   a. a bridge circuit having a first input connected to the tip line and a second input connected to the ring line and having a first output and a second output, a second potential difference existing between the first output and the second output, the second potential difference equal to the absolute value of the first potential difference;
   b. a differential amplifier, operationally coupled to the first output and the second output, that generates a difference signal representative of the second potential difference;
   c. a first comparator, responsive to the difference signal, that generates a first indicator signal when the difference signal is above a first value corresponding to a maximum value of potential difference between the tip line and the ring line when the handset is off-hook;
   d. a second comparator, responsive to the difference signal, that generates a second indicator signal when the difference signal is below a second value corresponding to a minimum value of potential difference between the tip line and the ring line when the handset is off-hook; and
   e. a microprocessor, responsive to the first indicator signal and the second indicator signal, directed by a computer program to:
      i. generate an off-hook signal indicating that the handset is off-hook when the difference signal is between the first value and the second value;
      ii. continue to generate the off-hook signal if the difference signal drops below the second value and remains below the second value for less than a predetermined period; and
      iii. cease to indicate that the handset is off-hook if the difference signal drops below the second value and remains below the second value for at least the predetermined period.

9. The apparatus of claim 8 further comprising a bandpass filter that removes selected AC signal components from the difference signal.

10. The apparatus of claim 8 wherein the differential amplifier comprises an integrated circuit op amp, having two input terminals and an output terminal, configured to generate the signal on the output terminal representative of the voltage difference between the two input terminals.

11. A series of operational steps to be performed on a computer used to detect an off-hook condition of a telephone and to perform control functions of an auxiliary telecommunications device, the telephone and the auxiliary device being operationally coupled to a telephone line on which DTMF digits are dialed, the telephone having a handset, the computer responsive to a voltage difference signal indicative of a voltage value between the tip line and the ring line of the telephone, comprising the steps of:
   a. recording DTMF digits being dialed into a memory when the difference signal indicates that the voltage value is below the maximum value corresponding to the off-hook condition;
   b. starting a timer when the voltage signal indicates that the voltage value has fallen below a predetermined value; and
   c. interrupting the recording of DTMF digits and resetting the memory when the timer indicates that a preselected period has passed while the voltage value is below the predetermined value.

12. The series of operational steps of claim 11 further comprising the steps of:
   a. detecting when a complete set of DTMF digits have been dialed; and
   b. generating a signal causing the auxiliary telecommunications device to proceed with an operation once the complete set of DTMF digits has been dialed.

13. The series of operational steps of claim 12 further comprising the step of resetting the memory after generating the signal indicating that the auxiliary telecommunications device is to proceed.

14. An apparatus connected to the tip line and the ring line of a telephone line, comprising:
   a. a telephone connected to the tip line and the ring line;
   b. an auxiliary device connected to the tip line and the ring line;
   c. means for detecting an off-hook condition in the telephone, comprising
      i. a bridge circuit having a first input connected to the tip line and a second input connected to the ring line and having a first output and a second output, a second potential difference existing between the first output and the second output, the second potential difference equal to the absolute value of a first potential difference existing between the first output and the second output;
      ii. a differential amplifier, operationally coupled to the first output and the second output, that generates a difference signal representative of the second potential difference;
      iii. a first comparator, responsive to the difference signal, that generates a first indicator signal when the difference signal is above a first value corresponding to a maximum value of potential difference between the tip line and the ring line when the handset is off-hook;
      iv. a second comparator, responsive to the difference signal, that generates a second indicator signal when the difference signal is below a second value corresponding to a minimum value of potential difference between the tip line and the ring line when the handset is off-hook; and
      v. a microprocessor, responsive to the first indicator signal and the second indicator signal, programmed to determine when the handset is off-hook and to generate an operative control signal to a facsimile machine when the handset is off-hook, the microprocessor being directed by a computer program to:
         A. record DTMF digits being dialed into a memory when the values of the first indicator signal and the second indicator signal indicate that the value of the difference signal is within a range corresponding to an off-hook condition;

B. start a timer when the second indicator signal indicates that the difference signal has fallen below the second value; and C. interrupt the recording of DTMF digits and reset the memory when the timer indicates a preselected period has passed while the value of the difference signal is below the second value; and d. means, responsive to the detecting means, for inhibiting the operation of the auxiliary device when the detecting means detects an off-hook condition.

15. The apparatus of claim 14 wherein the auxiliary device comprises a facsimile machine.

16. The apparatus of claim 14 further comprising a bandpass filter that removes selected AC signal components from the difference signal.

17. The apparatus of claim 16 Wherein the bandpass filter comprises an integrated circuit op amp configured to act as a bandpass filter.

18. The apparatus of claim 16 wherein the bandpass filter comprises an RLC circuit having a band pass frequency characteristic.

19. The apparatus of claim 14 wherein the microprocessor is further directed by a computer program to:

a. detect when a complete set of DTMF digits have been dialed; and b. generate a signal causing the facsimile machine to proceed with an operation once the complete set of DTMF digits has been dialed.

20. The apparatus of claim 19 wherein the microprocessor is further directed by a computer program to reset the memory after generating the signal indicating that the facsimile machine is to proceed.

* * * * *